United States Patent
Seyfried et al.

(10) Patent No.: US 7,038,193 B2
(45) Date of Patent: May 2, 2006

(54) METHOD AND DEVICE FOR SEPARATING DIFFERENT EMISSION WAVELENGTHS IN A SCANNING MICROSCOPE

(75) Inventors: Volker Seyfried, Nussloch (DE); Rafael Storz, Heidelberg (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 122 days.

(21) Appl. No.: 10/744,205

(22) Filed: Dec. 22, 2003

(65) Prior Publication Data
US 2005/0121603 A1    Jun. 9, 2005

(30) Foreign Application Priority Data
Dec. 8, 2003    (DE) ............................. 103 57 584

(51) Int. Cl.
*H01J 3/14* (2006.01)
*H01J 40/14* (2006.01)
*H01J 5/16* (2006.01)
*G01J 5/02* (2006.01)

(52) U.S. Cl. ............... 250/234; 250/339.12; 356/317; 356/318; 356/326; 359/385; 359/368

(58) Field of Classification Search ............ 250/339.12
See application file for complete search history.

(56) References Cited

U.S. PATENT DOCUMENTS

| 4,734,578 | A | * | 3/1988 | Horikawa | ................ | 250/234 |
| 6,066,459 | A |   | 5/2000 | Garini et al. | ............... | 435/6 |
| 6,337,472 | B1 | * | 1/2002 | Garner et al. | ............ | 250/201.3 |
| 6,462,345 | B1 | * | 10/2002 | Simon et al. | ............. | 250/458.1 |
| 2002/0052048 | A1 |   | 5/2002 | Stein et al. | ................ | 436/172 |
| 2003/0226977 | A1 |   | 12/2003 | Storz et al. | ............. | 250/458.1 |
| 2004/0238756 | A1 |   | 12/2004 | Rigler et al. | ............. | 250/458.1 |
| 2005/0121603 | A1 |   | 6/2005 | Seyfried et al. | ............. | 250/234 |

FOREIGN PATENT DOCUMENTS

| DE | 2 60 342 | 5/1913 |
| DE | 41 15 401 | 11/1992 |

(Continued)

OTHER PUBLICATIONS

European Search Report for EP 1 542 051 A1, Feb. 7, 2005 (1 page); and brief translation thereof (1 page).

*Primary Examiner*—Stephone B. Allen
*Assistant Examiner*—Suezu Ellis
(74) *Attorney, Agent, or Firm*—Davidson, Davidson & Kappel, LLC (57) ABSTRACT

A method for separating different emission wavelengths in a scanning microscope includes scanning a specimen with an illuminating light beam by passing the illuminating light beam over the specimen using a beam deflector, and selectively applying each of a plurality of excitation wavelengths to the illuminating light beam during the scanning according to a predefinable illumination scheme. Emission light coming from the specimen is detected using a detector, the emission light including emission wavelengths corresponding to the excitation wavelengths. The detector is read out when an excitation wavelength is applied so as to provide detected signals. The detected signals are associated with the respective excitation wavelengths using the illumination scheme.

27 Claims, 5 Drawing Sheets

FOREIGN PATENT DOCUMENTS

| | | |
|---|---|---|
| DE | 197 02 753 | 7/1998 |
| DE | 19915137 | 10/2000 |
| DE | 100 54 426 | 5/2002 |
| DE | 102 10 737 | 3/2003 |
| DE | 102 25 838 | 12/2003 |
| EP | 1 542 051 | 6/2005 |
| JP | 01282515 | 11/1989 |

\* cited by examiner

METHOD AND DEVICE FOR SEPARATING DIFFERENT EMISSION WAVELENGTHS IN A SCANNING MICROSCOPE

Priority is claimed to German patent application 103 57 584.7, which is hereby incorporated by reference herein.

The present invention relates generally to a method and to a device to separate different emission wavelengths in a scanning microscope. In particular, the present invention relates to a method and to a device in which a specimen is scanned with an illuminating light beam that is passed over the specimen by means of a beam deflector, the illuminating light beam having different, selectively applied excitation wavelengths, and the emission light coming from the specimen and containing the emission wavelengths that correspond to the excitation wavelengths is picked up in at least one detector.

BACKGROUND

Methods and devices of the kind under discussion here have long been known in actual practice and they are used especially in fluorescence microscopy. In the realm of fluorescence microscopy, a specimen to be examined is often dyed with several fluorescent dyes so that the aspect of separating the individual emission wavelengths is of paramount significance. With the methods known so far, the specimen is first illuminated for a certain length of time with a first excitation wavelength and data is then gathered in order to be able to generate a first image of the specimen in this manner. Subsequently, the specimen is illuminated for the same length of time with a second excitation wavelength and thus a second image of the specimen is obtained. This process is carried out consecutively for all excitation wavelengths of the fluorescent dyes contained in the specimen, so as to obtain a discrete image for each excitation wavelength. The process can be performed linewise as well as imagewise, which is known by the designation "sequential scan".

A particular drawback associated with the prior-art sequential scan is that the specimen has to be scanned several times in order to generate the individual images. This procedure is extremely time-consuming since the imaging speed is essentially limited by the speed of the scanning procedure. Thus, in comparison to normal imaging, approximately twice as much time is needed to create separate images for two excitation wavelengths and about three times as much time is needed for three excitation wavelengths. As a result, the imaging rate in the confocal scanning microscope is significantly reduced.

Moreover, the sequential scan entails problems when the image changes rapidly, for instance, due to processes transpiring inside the specimen over a short period of time. When such rapid processes take place, differences appear in the individual images since the images for different excitation wavelengths are not taken simultaneously. This is particularly critical with the bidirectional linewise sequential scan, since in this case, there is not even a fixed time relationship between the individual pixels. When the image data thus obtained is further processed with conventional methods, for example, by means of spectrum deconvolution or linear unmixing, artifacts show up in the processed images.

SUMMARY OF THE INVENTION

Thus, it is an object of the present invention to provide a method and a device to separate different emission wavelengths in a scanning microscope of the above-mentioned type in a simple manner in such a way as to achieve increased imaging speed for taking separate images of a specimen for several excitation wavelengths, so that especially even rapid processes transpiring inside the specimen can be imaged without errors.

The present invention provides a method to separate different emission wavelengths in a scanning microscope (6), in which process a specimen (4) is scanned with an illuminating light beam (10) that is passed over the specimen (4) by means of a beam deflector, the illuminating light beam (10) having different excitation wavelengths (1, 2, 3), and in which process the emission light coming from the specimen (4) and containing the emission wavelengths that correspond to the excitation wavelengths (1, 2, 3) is picked up in at least one detector (5). According to the method, the excitation wavelengths (1, 2, 3) are selectively applied to the illuminating light beam (10) during the scanning procedure according to a predefinable illumination scheme, the detector (5) is read out every time an excitation wavelength (1, 2, 3) is applied, and the detected signals are associated with the excitation wavelengths (1, 2, 3) employing the known illumination scheme.

According to the invention, it has been recognized that reducing the imaging time for several excitation wavelengths calls for efforts to be directed at the scanning procedure itself since the latter is the decisive factor for the imaging speed. Before the backdrop of this insight, it was then realized that all of the excitation wavelengths to be examined can be processed in one single scanning procedure. For this purpose, according to the invention, the excitation wavelengths are selectively applied to the illuminating light beam during the scanning procedure according to a predefinable illumination scheme. The detector is read out at least once every time an excitation wavelength is applied and the detected signals are associated with the excitation wavelengths on the basis of the known illumination scheme. In this manner, a discrete image can be obtained for each excitation wavelength with one single scanning procedure, as a result of which, the time needed to take separate images is significantly reduced in comparison to the known sequential scan. Moreover, with the method according to the invention, rapid processes transpiring inside the specimen, for example, biological or biochemical processes, can be imaged in a flawless manner since the images for the individual excitation wavelengths are taken practically simultaneously.

In an advantageous manner, discrete laser lines could be employed as different excitation wavelengths. The individual excitation wavelengths could then be applied to the illuminating light beam very easily, for instance, by simply switching the laser in question on and off.

With an eye towards a simple association of the detected signals with the individual excitation wavelengths, it could be provided that both the point in time and the duration of the application of each of the excitation wavelengths are precisely specified in the illumination scheme. Moreover, for purposes of achieving a precise quantitative examination of the specimen, the intensity with which the excitation wavelength is applied could be individually specified in the illumination scheme for each of the excitation wavelengths.

In order to ensure that, in the later imaging of the specimen, each imaging pixel contains information from each of the excitation wavelengths, the spatial advancing of the illuminating light beam on the specimen and the illumination scheme could be coordinated with each other in such a way that each of the excitation wavelengths is applied to the illuminating light beam at least once within each pixel of the image of the specimen. If specific excitation wavelengths are of special interest for certain regions of the specimen, these excitation wavelengths could also be applied several times for each pixel. In a corresponding manner, the application of certain excitation wavelengths for pixels that correspond to "uninteresting" regions of the specimen could also be completely skipped.

In a preferred embodiment, a regularly recurring application sequence of the individual excitation wavelengths over the course of time of the scanning procedure is specified in the illumination scheme. Here, the spatial advancing of the illuminating light beam on the specimen and the illumination scheme could be coordinated with each other in such a way that a complete cycle of the recurring sequence corresponds to one pixel of the image of the specimen. As a result, the pixels of a certain image of a concrete excitation wavelength are directly comparable to each other since all pixel information stems from the same irradiation each time. This applies to every single image taken.

Instead of one single complete cycle, it would likewise be feasible for several, preferably two or three, cycles of the recurring sequence to correspond to one pixel of the image of the specimen. Such a coordination of the spatial advancing of the illuminating light beam on the specimen with the illumination scheme would allow a higher illumination intensity per pixel and thus improved photon statistics.

With an eye towards a particularly simple association of the detected signals with the individual excitation wavelengths, only one single excitation wavelength could be applied to the illuminating light beam at each point in time of the scanning procedure. As an alternative to this, several, preferably two, excitation wavelengths could be simultaneously applied to the illuminating light beam at predefinable points in time. With this measure, either the photon statistics could be improved while maintaining the same scanning speed or else the speed of the scanning procedure could be increased while the photon statistics remain the same.

As a function of the illumination scheme selected in each case, the individual images of the specimen could be reconstructed by means of appropriate multiplication, summation and/or subtraction of the detected signals. Generally speaking, a corresponding linear equation system will have to be solved in order to reconstruct the individual images. For purposes of providing a maximum information density pertaining to the examined specimen, the images reconstructed for the different excitation wavelengths could be shown in an overlay.

Examples of suitable detectors are a photomultiplier, an APD (avalanche photodiode), an MCP (microchannel plate detector) or else photodiode arrays. The essential aspect in this context is a sufficiently high speed of the detector so that it can be read out every time an excitation wavelength is applied (at least once).

In an especially preferred embodiment, the light intensity and/or the duration of the application of an excitation wavelength could be varied over the course of time of the scanning procedure. Thus, certain laser lines—for example, in ROIs (regions of interest), that is to say, in locally limited areas of the specimen which are of particular interest for certain reasons—could be applied to a lesser or greater extent or else completely switched off.

In this context, the variation in the light intensity and/or the time duration could already be specified prior to a measurement. With an eye towards rendering the method highly flexible, the variation could also be specified during a measurement and thus it would also be possible to actively respond to certain predefinable measuring data. If, for instance, one of the emission wavelengths appears with insufficient intensity in the detected signals, the intensity of the appertaining wavelength could be increased—or in the reverse case—decreased during the measuring procedure. A corresponding variation in the light intensity and/or time duration could also be carried out using decision-making criteria obtained from the data of the momentary image or of preceding images extracted by means of image processing.

The present invention also provides a device to separate different emission wavelengths in a scanning microscope (6). The device includes at least one light source (9) that serves to generate an illuminating light beam (10) having different excitation wavelengths (1, 2, 3), whereby a specimen (4) can be scanned with an illuminating light beam (10) that is passed over the specimen (4) by means of a beam deflector. The device also includes at least one detector (5) to pick up the emission light coming from the specimen (4) and containing the emission wavelengths that correspond to the excitation wavelengths (1, 2, 3). The excitation wavelengths (1, 2, 3) can be selectively applied to the illuminating light beam (10) during the scanning procedure according to a predefinable illumination scheme. The detector (5) can be read out every time an excitation wavelength (1, 2, 3) is applied, and in the detected signals can be associated with the excitation wavelengths (1, 2, 3) employing the known illumination scheme. Preferably, the device according to the invention serves to carry out a method according to the present invention, so that, for purposes of avoiding repetitions, reference is hereby made to the preceding part of the description.

According to a particular embodiment of the present invention, an excitation wavelength could be applied by means of an AOTF (acousto-optical tunable filter), an AOM (acousto-optical modulator), an EOM (electro-optical modulator), a mechanical shutter, by direct driving of the laser, or by other light control means. A direct driving of the laser is especially advantageous in the case of semiconductor lasers since switching frequencies within the GHz range can be realized with such lasers.

The light intensity of the applied excitation wavelengths could be set in a familiar manner using an adjusting unit with an attenuator, a filter, an AOTF, an AOM, an EOM or the like. Moreover, the intensity could also be adjusted via the duty cycle or via the number of repetitions of a cycle per pixel, as described above. In a particularly advantageous manner, the adjusting unit, for example, in the form of an AOTF, for achieving a continuous adjustment of the light intensity could be coupled to a digital circuit that serves to apply the individual excitation wavelengths.

In another advantageous manner, a computing unit could be provided to associate the timing of the application of an excitation wavelength and to read out the detector. The computing unit could also control the association of the detected signals with the different excitation wavelengths. In concrete terms, the computing unit could be, for instance, a CPU, a DSP, an FPGA or a driver board.

BRIEF DESCRIPTION OF THE DRAWINGS

There are different possibilities to advantageously configure and refine the teaching of the present invention. The invention will be elaborated upon below based on exemplary embodiments of the invention with reference to the drawing.

DETAILED DESCRIPTION

Figure 1:
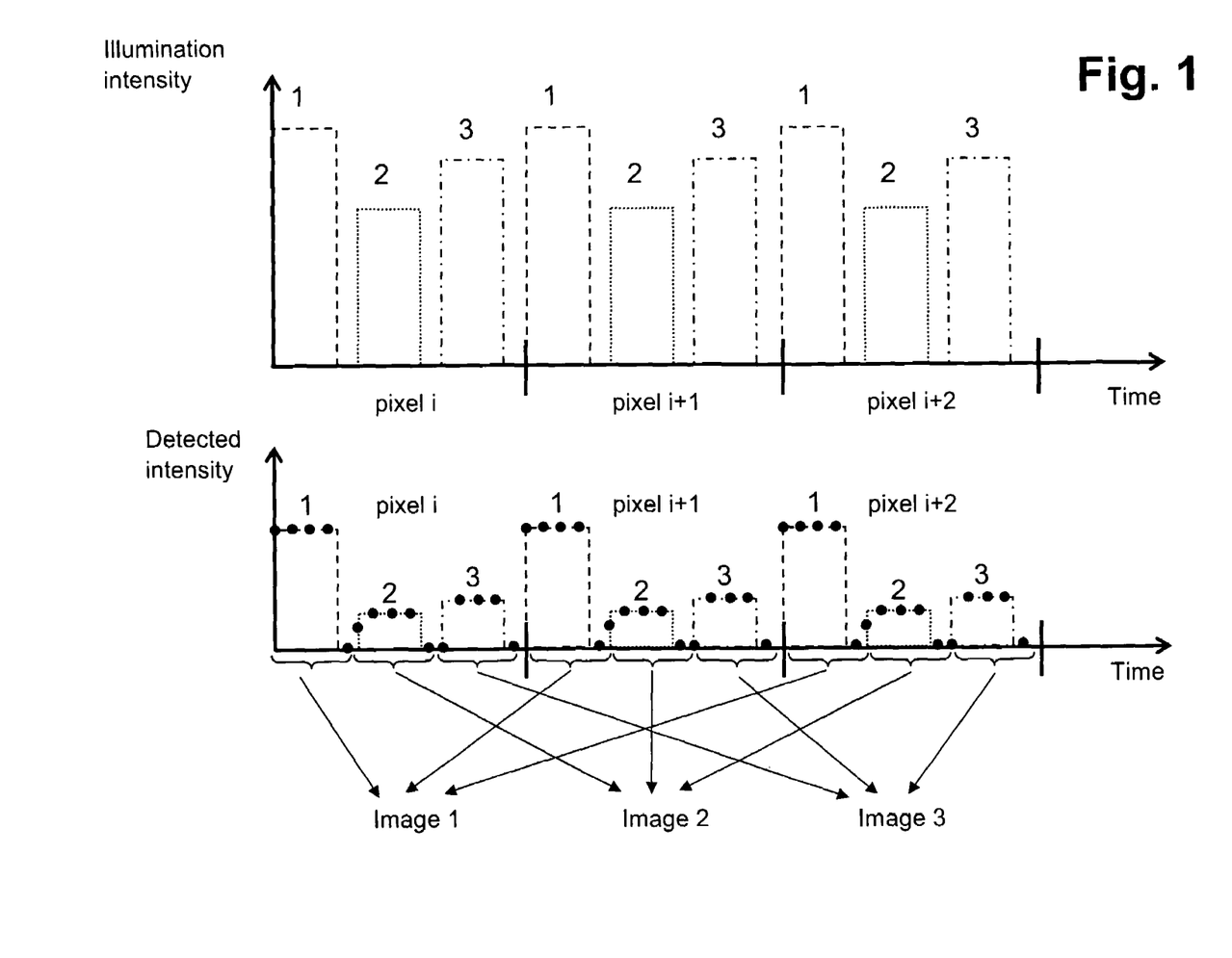
FIG. 1 shows, in the form of a diagram, a first embodiment of an illumination scheme of a method according to the invention to separate different emission wavelengths in a scanning microscope.
Figure 4:
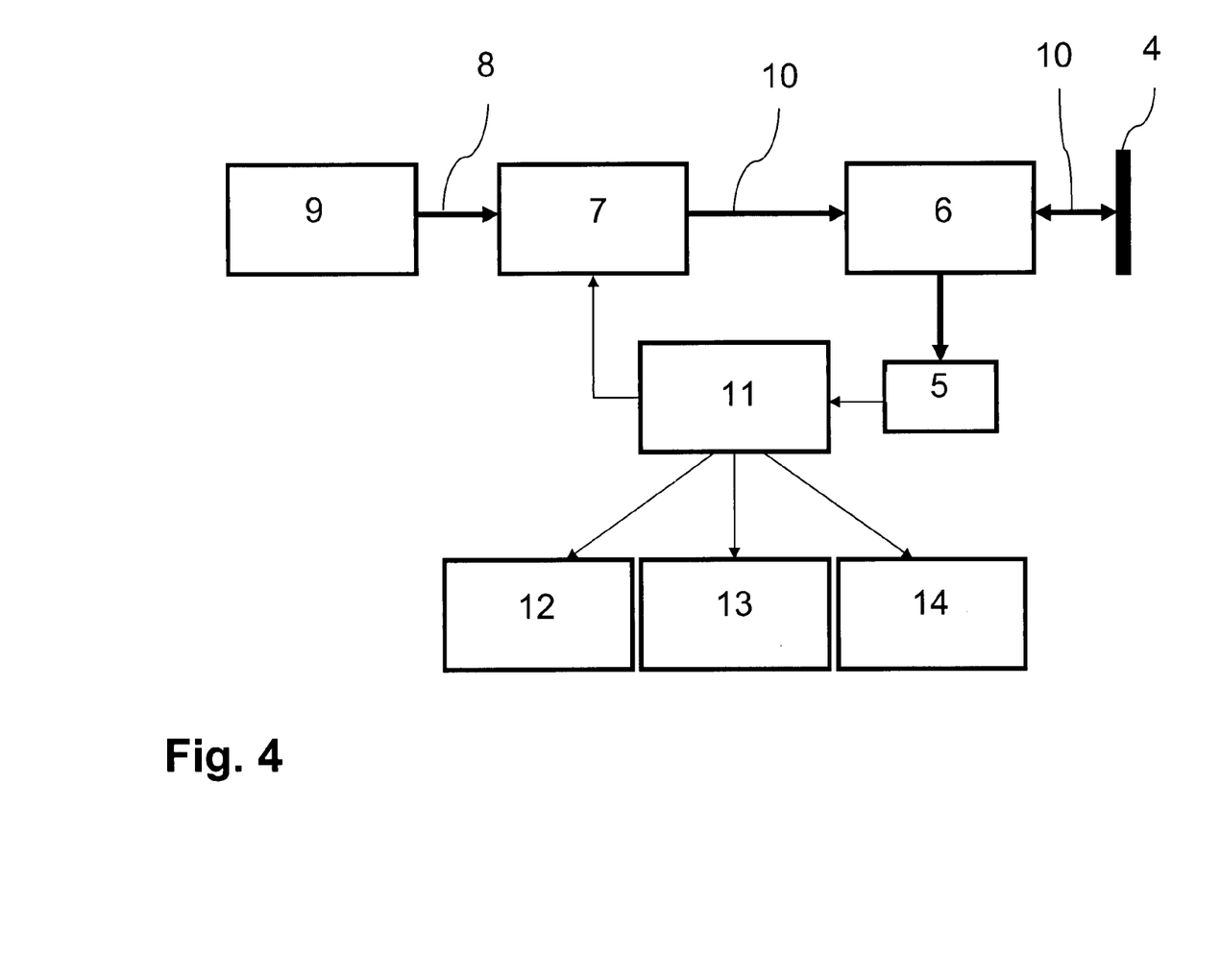
FIG. 4 shows a schematic representation of an embodiment of a device according to the invention to separate different emission wavelengths in a scanning microscope.

With reference being had to FIG. 4, FIG. 1 shows two diagrams whereby the illumination intensity of specimen 4 over the course of time of the scanning procedure is depicted in the upper diagram. Specimen 4 is irradiated with a total of three excitation wavelengths 1, 2, 3 according to a predefinable illumination scheme. In the embodiment depicted in FIG. 1, an illumination scheme has been chosen which shows a time sequence of applied individual excitation wavelengths 1, 2, 3 that recurs regularly over the course of time of the scanning procedure. Here, the recurring sequence has been selected in such a way that a complete cycle of the sequence corresponds to one pixel of the later image.

The lower diagram shows the detected intensity of the emission wavelengths that correspond to the excitation wavelengths 1, 2, 3 over the course of time of the scanning procedure. The detector 5 is read out separately for each applied excitation wavelength 1, 2, 3. The reading-out of the detector 5 is indicated in the diagram by the dark dots. The detected signals are associated—according to the invention—with the excitation wavelengths 1, 2, 3 while employing the known illumination scheme. As is clearly evident in the lower diagram, a discrete image can be composed pixelwise for each individual excitation wavelength 1, 2, 3 in this manner.

Figure 2:
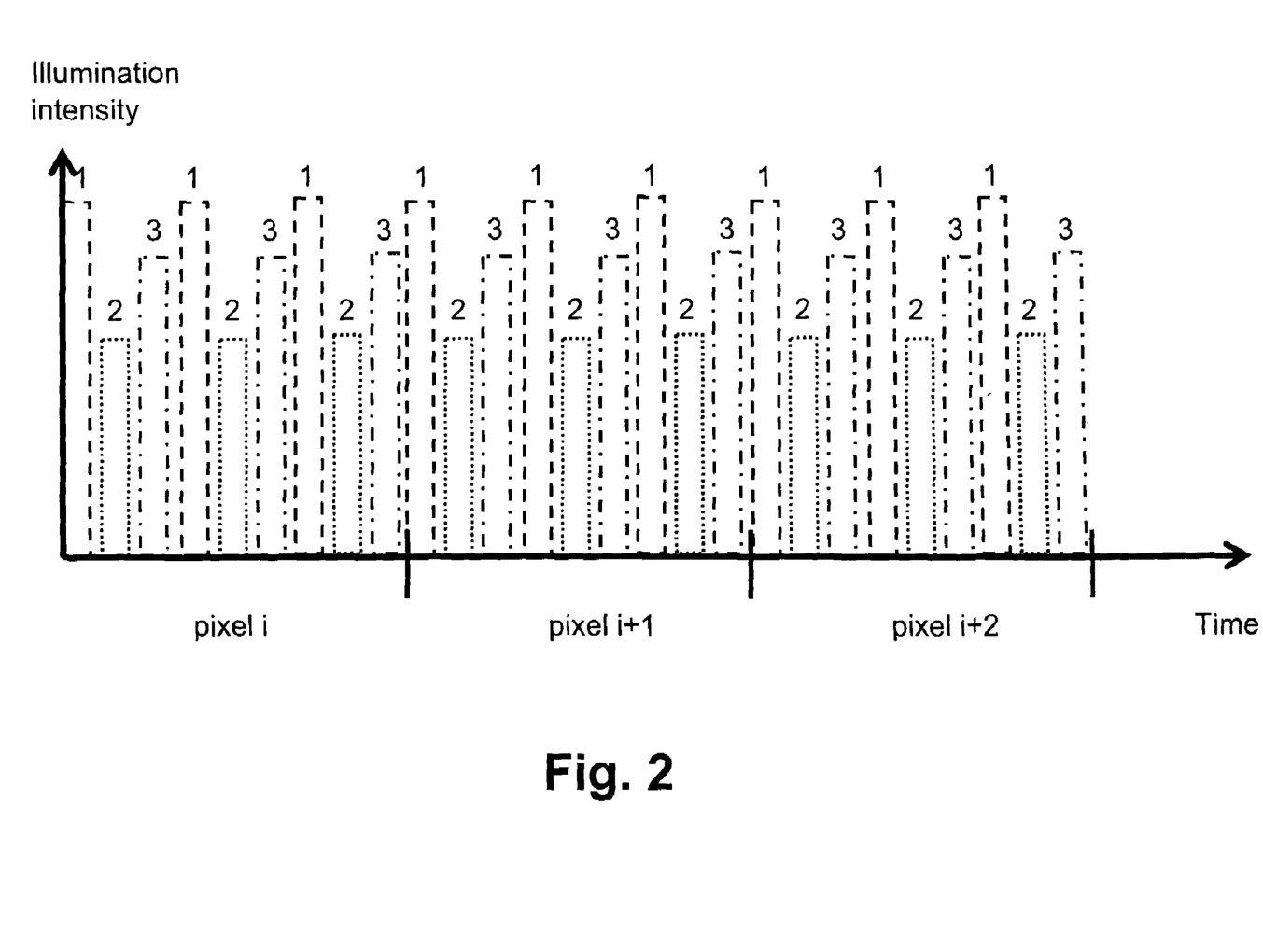
FIG. 2 shows, in the form of a diagram, a second embodiment of an illumination scheme of a method according to the invention.

FIG. 2 shows likewise in diagram form an illumination scheme similar to that of FIG. 1. Specimen 4, in turn, is irradiated with a regularly recurring sequence of the three excitation wavelengths 1, 2, 3 over the course of time of the scanning procedure. The only difference from the embodiment shown in FIG. 1 is that now the application of the individual excitation wavelengths 1, 2, 3 is carried out in such a way that a total of three complete cycles of the recurring sequence correspond to one pixel of the image of specimen 4. Since each individual excitation wavelength 1, 2, 3 is applied three times per pixel, on the one hand, specimen 4 is illuminated more uniformly and, on the other hand, higher quantum statistics can be achieved per pixel for each one of the excitation wavelengths 1, 2, 3.

Figure 3:
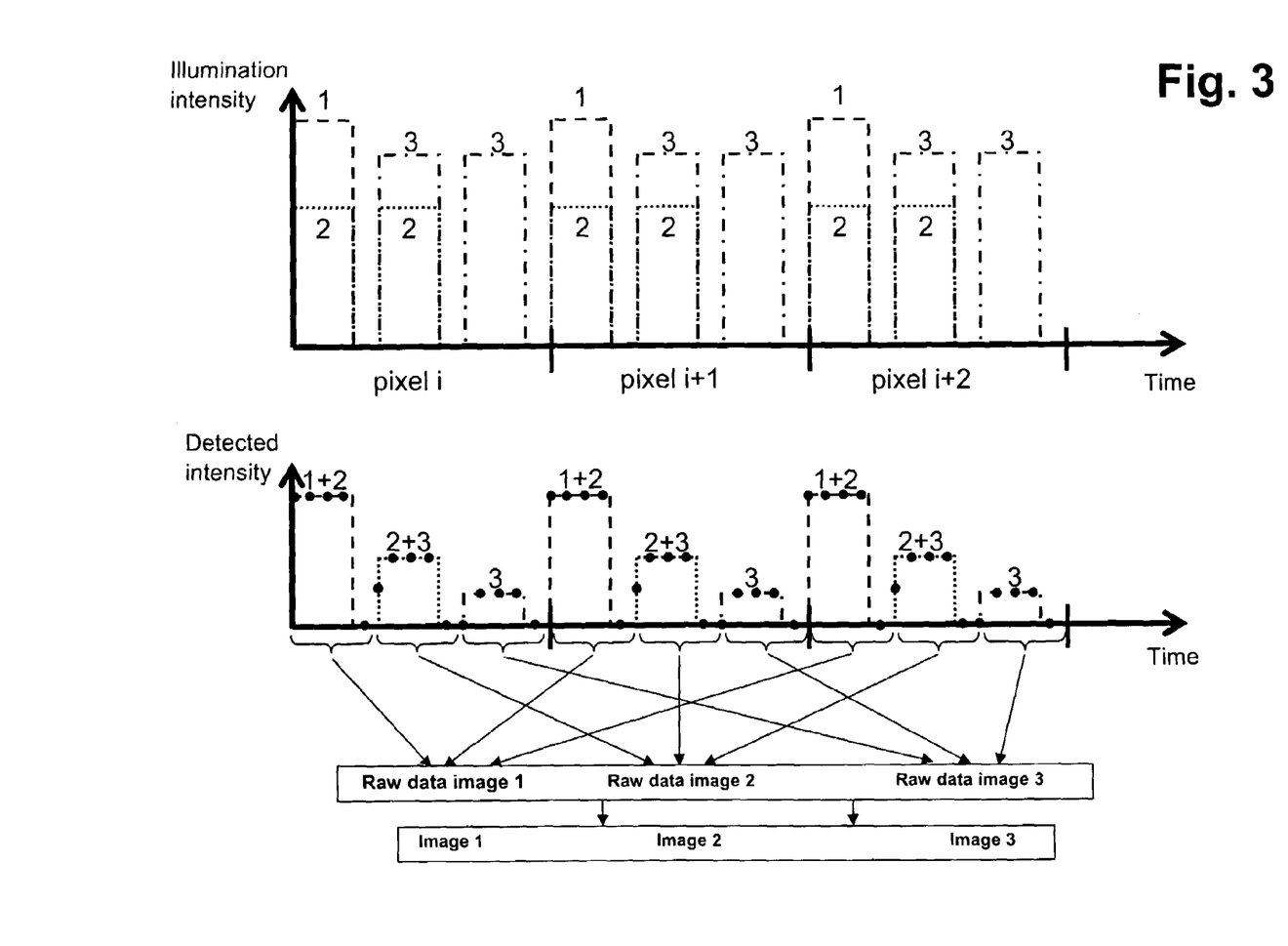
FIG. 3 shows, likewise in diagram form, a third embodiment of an illumination scheme of a method according to the invention.

The upper diagram in FIG. 3 shows, in turn, the illumination intensity as a function of the course of time of the scanning procedure. Unlike the illumination schemes of FIG. 1 and FIG. 2, specimen 4 in this embodiment is, in part, illuminated simultaneously with two different excitation wavelengths 1, 2, 3. In concrete terms, specimen 4 is first irradiated with a combination of the two excitation wavelengths 1 and 2. This is followed by illumination with the two excitation wavelengths 2 and 3 and finally only with excitation wavelength 3. This sequence is repeated regularly whereby, in turn, a complete cycle corresponds to one pixel of the image.

The lower diagram again shows the detected intensity as a function of the course of time of the scanning procedure. Each one of the dark dots signifies the reading-out of the detector 5. For purposes of generating separate images for the individual excitation wavelengths 1, 2, 3, the detected signals are first pre-sorted. The signals obtained during illumination with the excitation wavelengths 1 and 2 are grouped to form the raw data for image 1, while the signals obtained from the illumination with the excitation wavelengths 2 and 3 are grouped to form the raw data for image 2, and finally the signals taken during illumination with the excitation wavelength 3 are compiled to form the raw data for image 3. The final images for the individual excitation wavelengths 1, 2, 3 can be generated by the appropriate multiplication, summation and/or subtraction of the raw data. In the case at hand here, the image for excitation wavelength 2, for example, could be easily generated by means of the pixelwise subtraction of the raw data of image 3 from the raw data of image 2. The imaging for excitation wavelength 1 could then be reconstructed in another step. Generally speaking, that is to say, in the case of complicated illumination schemes, a corresponding linear equation system needs to be solved in order to reconstruct the individual images.

FIG. 4 schematically shows an embodiment of a device according to the invention to separate different emission wavelengths in a scanning microscope 6. The device comprises an AOTF 7 which is operated in such a way that certain wavelengths are blocked out of the light beam 8 coming from a light source 9 while predefinable excitation wavelengths 1, 2, 3 are allowed to pass through. In other words, the AOTF 7 is used to apply predefinable excitation wavelengths 1, 2, 3 to the illuminating light beam 10 with precise timing. The illuminating light beam 10 thus constructed is coupled into the microscope 6 and passed over the specimen 4 by means of a beam deflector unit arranged in the microscope 6.

The signals picked up by the detector 5 are conveyed to a central processing unit 11 that regulates the time association between the application of the individual excitation wavelengths 1, 2, 3 and the detection. The central processing unit 11 is also responsible for associating the detected signals with the different excitation wavelengths 1, 2, 3. The data associated with the individual excitation wavelengths 1, 2, 3 is further processed in separate data channels 12, 13, 14 in order to then finally generate a discrete image of specimen 4 for each excitation wavelength 1, 2, 3.

Figure 5:
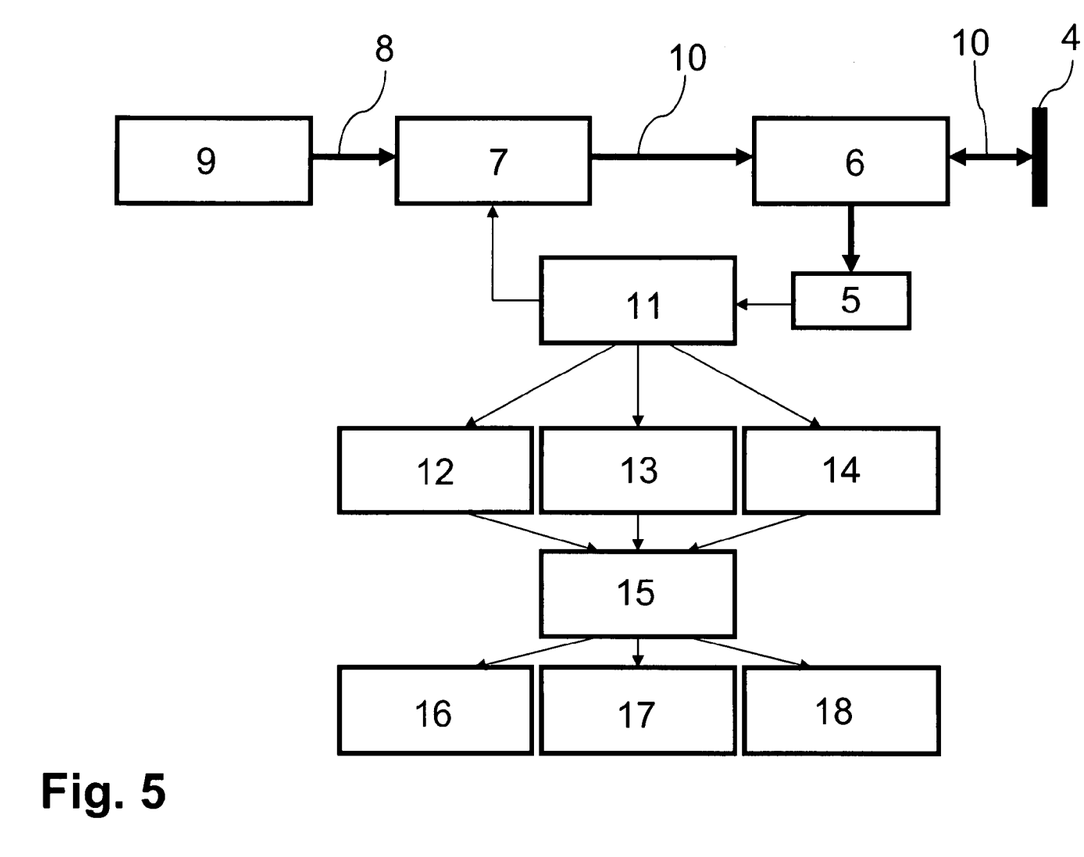
FIG. 5 shows a schematic representation of the device from FIG. 4 with an additional unit for linear unmixing.

FIG. 5 essentially shows in schematic form the device from FIG. 4 with an additional unit 15 which serves to carry out a linear unmixing for better separation of the various fluorescent dyes 16, 17, 18 in specimen 4. Such an unmixing is sufficiently known from the literature so that it will not be elaborated upon here. Only by way of an example, reference is hereby made to German Patent DE 199 15 137 and U.S. Pat. No. 6,066,459, both of which are hereby incorporated by reference herein. If the emission of the fluorescent dyes is picked up by several spectral detectors or detector channels, the linear unmixing of the data obtained employing the method according to the invention can advantageously simultaneously extend to the excitation as well as the emission spectra.

It should be pointed out that the device described is also particularly well-suited for use in combination with a spectral detector, with a spectrometer, in fluorescence-lifetime microscopy, in fluorescence-correlation spectroscopy or similar applications.

In conclusion, special mention should be made of the fact that the embodiments elaborated upon above only serve to provide an exemplary explanation of the teaching being claimed but said teaching should not be construed as being limited to said embodiments.

List of Reference Numerals
1 excitation wavelength
2 excitation wavelength
3 excitation wavelength
4 specimen
5 detector
6 scanning microscope
7 AOTF
8 light beam
9 light source
10 illuminating light beam
11 central processing unit
12 data channel
13 data channel
14 data channel
15 linear unmixing unit
16 fluorescent dye
17 fluorescent dye
18 fluorescent dye

What is claimed is:

1. A method for separating different emission wavelengths in a scanning microscope, comprising:
scanning a specimen with an illuminating light beam by passing the illuminating light beam over the specimen using a beam deflector;
selectively applying each of a plurality of excitation wavelengths to the illuminating light beam during the scanning according to a predefinable illumination scheme, wherein the selectively applying is performed so as to vary at least one of a light intensity and a time duration of an application of at least one of the excitation wavelengths over a time period of the scanning;
detecting emission light coming from the specimen using at least one detector, the emission light including a plurality of emission wavelengths corresponding to the excitation wavelengths, the at least one detector being read out upon each selective applying of a respective excitation wavelength so as to provide respective corresponding detected signals;
associating the detected signals with the respective excitation wavelengths using the illumination scheme; and
specifying the at least one of the variation in the light intensity and the time duration as a function of information obtained from data of at least one of a momentary image and a preceding image, the information being extracted using an image processing.

2. The method as recited in claim 1 wherein discrete laser lines are used as the excitation wavelengths.

3. The method as recited in claim 2 wherein the selectively applying is performed by switching at least one laser on and off.

4. The method as recited in claim 1 wherein the illumination scheme specifies a point in time and a time duration of the applying of each of the excitation wavelengths.

5. The method as recited in claim 1 wherein the illumination scheme specifies an intensity for each of the excitation wavelengths.

6. The method as recited in claim 1 further comprising coordinating the illumination scheme and a spatial advancing of the illuminating light beam on the specimen so as to apply each of the excitation wavelengths to the illuminating light beam at least once within each pixel of an image of the specimen.

7. The method as recited in claim 1 wherein the illumination scheme specifies a regularly recurring application sequence of the respective excitation wavelengths over a time period of the scanning.

8. The method as recited in claim 7 further comprising coordinating the illumination scheme and a spatial advancing of the illuminating light beam on the specimen so that a complete cycle of the recurring application sequence corresponds to one pixel of an image of specimen.

9. The method as recited in claim 7 further comprising coordinating the illumination scheme and a spatial advancing of the illuminating light beam on the specimen so that a plurality of cycles of the recurring application sequence correspond to one pixel of an image of the specimen.

10. The method as recited in claim 9 wherein the coordinating the illumination scheme and a spatial advancing of the illuminating light beam on the specimen is performed so that two or three cycles of the recurring application sequence correspond to one pixel of an image of the specimen.

11. The method as recited in claim 7 wherein the applying is performed so as to simultaneously apply at least two of the excitation wavelengths to the illuminating light beam within one cycle of the regularly recurring application sequence at predefinable points in time.

12. The method as recited in claim 11 wherein the applying is performed so as to simultaneously apply two of the excitation wavelengths to the illuminating light beam within one cycle of the regularly recurring application sequence at predefinable points in time.

13. The method as recited in claim 1 wherein the applying is performed so as to apply only one excitation wavelength to the illuminating light beam at a time.

14. The method as recited in claim 1 further comprising reconstructing respective images of the specimen using at least one of multiplication, summation and subtraction of the detected signals.

15. The method as recited in claim 14 wherein the reconstructed respective images correspond respectively to the excitation wavelengths and further comprising showing the reconstructed respective images in an overlay.

16. The method as recited in claim 1 wherein the at least one detector includes at least one of a photomultiplier, an APD, an MCP detector and a fast photodiode array.

17. The method as recited in claim 1 further comprising specifying the at least one of the variation in the light intensity and the time duration prior to the scanning.

18. The method as recited in claim 1 further comprising specifying the at least one of the variation in the light intensity and the time duration automatically during the scanning as a function of predefinable measuring data.

19. An apparatus for separating different emission wavelengths in a scanning microscope, comprising:
at least one light source configured to generate an illuminating light beam;
a beam deflector configured to scan a specimen with the illuminating light beam by passing the illuminating light beam over the specimen;
a light control device configured to selectively apply each of a plurality of excitation wavelengths to the illuminating light beam during a scanning according to a predefinable illumination scheme so as to vary at least one of a light intensity and a time duration of an application of at least one of the excitation wavelengths over a time period of the scanning;

at least one detector configured to pick up emission light coming from the specimen, the emission light including a plurality of emission wavelengths corresponding to the excitation wavelengths, the at least one detector being configured to be read out upon each selective applying of a respective excitation wavelength so as to provide respective corresponding detected signal; and a processing device configured to;

associate the detected signals with the respective excitation wavelengths using the illumination scheme;

specify the at least one of the variation in the light intensity and the time duration as a function of information obtained from data of at least one of a momentary image and a preceding image; and extract the information using image processing.

20. The apparatus as recited in claim 19 wherein the light control device includes at least one of an AOTF, an AOM, an EOM, a mechanical shutter and a directly-driven laser.

21. The device as recited in claim 19 further comprising a light intensity control device configured to control an intensity of the applied excitation wavelengths.

22. The device as recited in claim 21 wherein the light intensity control device includes at least one of an attenuator, a filter, an AOTF, an ACM and an EOM.

23. The device as recited in claim 19 wherein the light control device is configured to control an intensity of the applied excitation wavelengths.

24. The device as recited in claim 23 wherein the light control device. includes an AOTF and a digital circuit coupled to the AOTF, the AOTF being configured to enable a continuous light adjustment.

25. The device as recited in claim 19 wherein the processing device is configured to associate a timing of the application of a respective excitation wavelength and to read out the at least one detector.

26. The device as recited in claim 19 wherein the processing device includes at least one of a CPU, a DSP, an FPGA and a driver board.

27. The device as recited in claim 19 wherein the at least one detector includes at least one of a photomultiplier, an APD, an MCP detector and a fast photo diode array.

* * * * *